US009515927B2

(12) United States Patent
Janardhanan (10) Patent No.: US 9,515,927 B2
(45) Date of Patent: Dec. 6, 2016

(54) SYSTEM AND METHOD FOR LAYER 3 PROXY ROUTING

(71) Applicant: Dell Products L. P., Round Rock, TX (US)

(72) Inventor: Pathangi Narasimhan Janardhanan, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 14/988,495

(22) Filed: Jan. 5, 2016

(65) Prior Publication Data

US 2016/0134533 A1    May 12, 2016

Related U.S. Application Data

(63) Continuation of application No. 13/934,117, filed on Jul. 2, 2013, now Pat. No. 9,258,209.

(51) Int. Cl.
| | |
|---|---|
| *H04L 12/28* | (2006.01) |
| *H04L 12/741* | (2013.01) |
| *H04L 12/715* | (2013.01) |
| *H04L 29/06* | (2006.01) |
| *H04W 88/16* | (2009.01) |

(52) U.S. Cl.
CPC ............. *H04L 45/74* (2013.01); *H04L 45/04* (2013.01); *H04L 69/18* (2013.01); *H04W 88/16* (2013.01)

(58) Field of Classification Search
CPC ....... H04L 45/04; H04L 45/74; H04L 69/18; H04L 45/245; H04L 45/123; H04L 45/28; H04L 12/2495; H04L 47/41; H04L 29/12028; H04L 61/103; H04W 88/16
USPC .......... 370/230, 235, 389, 392, 395.54, 401, 370/466
See application file for complete search history.

(56) References Cited

U.S. PATENT DOCUMENTS

| | | | | |
|---|---|---|---|---|
| 2005/0286518 | A1* | 12/2005 | Park ................. | H04L 29/12783 370/389 |
| 2009/0210518 | A1* | 8/2009 | Verma ............... | H04L 29/12028 709/220 |
| 2010/0214959 | A1* | 8/2010 | Kuehnel ........... | H04L 29/12264 370/255 |
| 2010/0272107 | A1* | 10/2010 | Papp ................. | H04L 29/12028 370/392 |

* cited by examiner

*Primary Examiner* — Mohamed Kamara
(74) *Attorney, Agent, or Firm* — Haynes and Boone, LLP (57) ABSTRACT

A system and method for efficiently handling layer 3 proxy routing after mobile devices move between subnets includes a controller and one or more ports coupled to the controller. The controller is configured to receive a gateway address request on the one or more ports, determine whether the gateway address request is received on an inter-domain link from a second gateway, determine whether the gateway address request is originated from the second gateway when the gateway address request is received on the inter-domain link, determine a layer 2 address of the second gateway when the gateway address request is not originated from the second gateway, form a gateway address response including the layer 2 address of the second gateway, and transmit the gateway address response on one of the one or more ports.

20 Claims, 10 Drawing Sheets

SYSTEM AND METHOD FOR LAYER 3 PROXY ROUTING

CROSS REFERENCE TO RELATED APPLICATIONS

This application is a continuation of U.S. patent application Ser. No. 13/934,117 filed on Jul. 2, 2013, the full disclosure of which is incorporated by reference herein in its entirety and for all purposes.

BACKGROUND

The present disclosure relates generally to information handling systems, and more particularly to layer 3 proxy routing.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Computer networks form the interconnection fabric that enables reliable and rapid communications between computer systems and data processors that are in both close proximity to each other and at distant locations. These networks create a vast spider web of intranets and internets for handling all types of communication and information. Networks are often divided into different subnets. When mobile devices move from one subnet to another subnet, the network should efficiently handle packet routing. Making all of this possible is a vast array of network switching products, such as gateway routers, that make routing decisions in order to deliver packets of information from a source system or first subnet, to a destination system or second subnet. Due to the size, complexity, and dynamic nature of these networks, sophisticated network switching products are often required to continuously make routing decisions and to update routing information as network configurations change. The routing decisions may be further complicated by use of these networks by mobile devices, each having different types and amounts of data that needs to be transferred as network traffic.

Accordingly, it would be desirable to provide a method and a system to efficiently handle routing after mobile devices move between subnets.

SUMMARY

According to some embodiments, a gateway includes a controller and one or more ports coupled to the controller. The controller is configured to receive a gateway address request on the one or more ports, determine whether the gateway address request is received on an inter-domain link from a second gateway, determine whether the gateway address request is originated from the second gateway when the gateway address request is received on the inter-domain link, determine a layer 2 address of the second gateway when the gateway address request is not originated from the second gateway, form a gateway address response including the layer 2 address of the second gateway, and transmit the gateway address response on one of the one or more ports.

According to some embodiments, an information handling system includes a first gateway configured to be coupled to a second gateway using an inter-domain link. The first gateway is configured to receive a gateway address request, determine whether the gateway address request is received on the inter-domain link, determine whether the gateway address request is originated from the second gateway when the gateway address request is received on the inter-domain link, determine a layer 2 address of the second gateway when the gateway address request is not originated from the second gateway, form a gateway address response including the layer 2 address of the second gateway, and transmit the gateway address response.

According to some embodiments, a method of managing a network includes receiving a gateway address request at a first gateway, determining whether the gateway address request is received on an inter-domain link from a second gateway, determining whether the gateway address request is originated from the second gateway when the gateway address request is received on the inter-domain link, determining a layer 2 address of the second gateway when the gateway address request is not originated from the second gateway, forming a gateway address response including instructions for associating a layer 3 address of the first gateway with the layer 2 address of the second gateway, and transmitting the gateway address response.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a Personal Digital Assistant (PDA), a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1A:
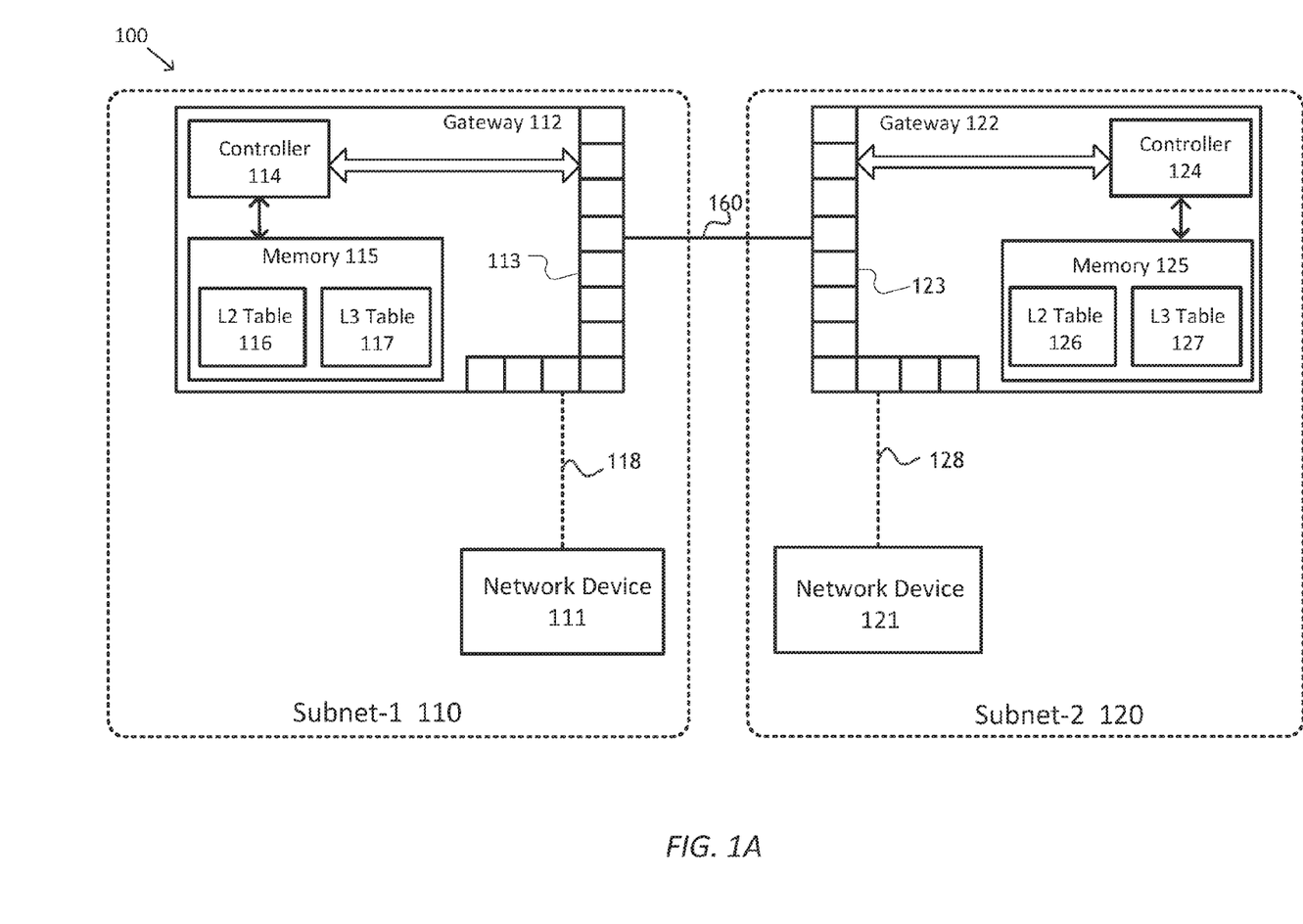
FIG. 1A is a simplified diagram of a network according to some embodiments.

FIG. 1A shows a simplified diagram of a network 100 according to some embodiments. As shown in FIG. 1A, network 100 may include a Subnet-1 110. Subnet-1 110 may include a gateway router 112 configured to route data packets to other subnets in network 100. Gateway router 112 may include a controller 114. In some examples, controller 114 may be configured to manage and/or control the operation of gateway router 112. In some examples, controller 114 may include one or more processors. Gateway router 112 also includes a memory 115. In some embodiments, controller 114 is coupled to memory 115. Memory 115 may include one or more forwarding information tables. In some examples, the forwarding information tables may include virtual LAN (VLAN) tables, a layer 2 (L2) table 116, a layer 3 (L3) table 117, layer 3 forwarding information bases, access control lists (ACLs), flow processing (FP) tables, and/or the like. In some examples, L2 table 116 may be used by gateway router 112 and/or controller 114 to store layer 2 addresses of the other gateway routers in network 100. L2 table 116 may also be used to store related layer 2 addresses of other network switching devices within Subnet-1 110, such as network device 111. In some examples, L3 table 117 may be used by gateway router 112 and/or controller 114 to store routing information. In some examples, controller 114 may maintain and/or update the one or more forwarding information tables (for example, L2 table 116 and L3 table 117) in memory 115. In some examples, the one or more forwarding information tables may be implemented using data structures other than tables and/or using databases. In some examples, the layer 2 addresses may include media access control (MAC) addresses.

Referring to FIG. 1A, network 100 may include a Subnet-2 120. Subnet-2 120 may include a gateway router 122 configured to route data packets to other subnets in network 100. Gateway router 122 may include a controller 124. In some examples, controller 124 may be configured to manage and/or control the operation of gateway router 122. In some examples, controller 124 may include one or more processors. Gateway router 122 also includes a memory 125. In some embodiments, controller 124 is coupled to memory 125. Memory 125 may include one or more forwarding information tables. In some examples, the forwarding information tables may include VLAN tables, a MAC table/L2 table 126, a L3 table 127, layer 3 forwarding information bases, ACLs, FP tables, and/or the like. In some examples, L2 table 126 may be used by gateway router 122 and/or controller 124 to store layer 2 addresses of the other gateway routers in network 100. L2 table 126 may also be used to store related layer 2 addresses of other network switching devices within Subnet-2 120, such as network device 121. In some examples, L3 table 127 may be used by gateway router 122 and/or controller 124 to store routing information. In some examples, controller 124 may maintain and/or update the one or more forwarding information tables (for example, L2 table 126 and L3 table 127) in memory 125. In some examples, the one or more forwarding information tables may be implemented using data structures other than tables and/or using databases. In some examples, the layer 2 addresses may include MAC addresses. In some examples, gateway router 122 may perform substantially the same function as gateway router 112 does.

As illustrated in FIG. 1A, gateway router 112 is connected to gateway router 122 by a link 160. Although only one network link is shown in link 160 as illustrated in FIG. 1A, link 160 may include one or more network links that are used to couple gateway router 112 to gateway router 122. In some examples, link 160 may be configured as a link aggregation group (LAG). Alternatively, network link 160 may be a virtual link trunking (VLT) LAG. As shown in FIG. 1A, because link 160 is between Subnet-1 110 and Subnet-2 120, link 160 is an inter-domain link Still referring to FIG. 1A, network 100 includes a network device 111. In some examples, network device 111 includes an electronic device, e.g., a computer. In some examples, network device 111 may include a layer 2 network switching device, configured to forward data packets to and from other network devices. For example, the layer 2 network switching device may be selected from an Ethernet switch, and/or an aggregation pair, etc. In some examples, network device 111 includes a router, configured to handle layer 3 routing using the Internet Protocol within Subnet-1 110. Although one network device is shown in Subnet-1 110 in FIG. 1A, a person having ordinary skill in the art would be able to understand that Subnet-1 110 may include any number of network devices configured in any suitable topology.

Network 100 of FIG. 1A also includes a network device 121. In some examples, network device 121 includes an electronic device, e.g., a computer. In some examples, network device 121 may include a layer 2 network switching device, configured to forward data packets to and from other network devices. For example, the layer 2 network switching device may be selected from an Ethernet switch, and/or an aggregation pair, etc. In some examples, networks device 121 includes a router, configured to handle layer 3 routing using Internet Protocol within Subnet-2 120. Although one network device is shown in Subnet-2 120 in FIG. 1A, a person having ordinary skill in the art would be able to understand that Subnet-2 120 may include any number of network devices configured in any suitable topology.

In some embodiments, network device 111 is coupled to one or more ports 113 of gateway router 112 using a link 118. Link 118 may be a single network link Link 118 may include one or more network links that are used to couple network device 111 to gateway router 112. In some examples, when there are more than one network link in link 118, a LAG link may be formed between the network device 111 and gateway router 112. In some embodiments, network device 111 may not be directly coupled to gateway router 112, but may be coupled through one or more network switching devices (not shown).

In some embodiments, network device 121 is coupled to one or more ports 123 of gateway router 122 using a link 128. Link 128 may be a single network link Link 128 may include one or more network links that are used to couple network device 121 to gateway router 122. In some examples, when there are more than one network link in link 128, an LAG may be formed between the network device 121 and gateway router 122. In some embodiments, network device 121 may not be directly coupled to gateway router 122, but may be coupled through one or more network switching devices (not shown).

Figure 1B:
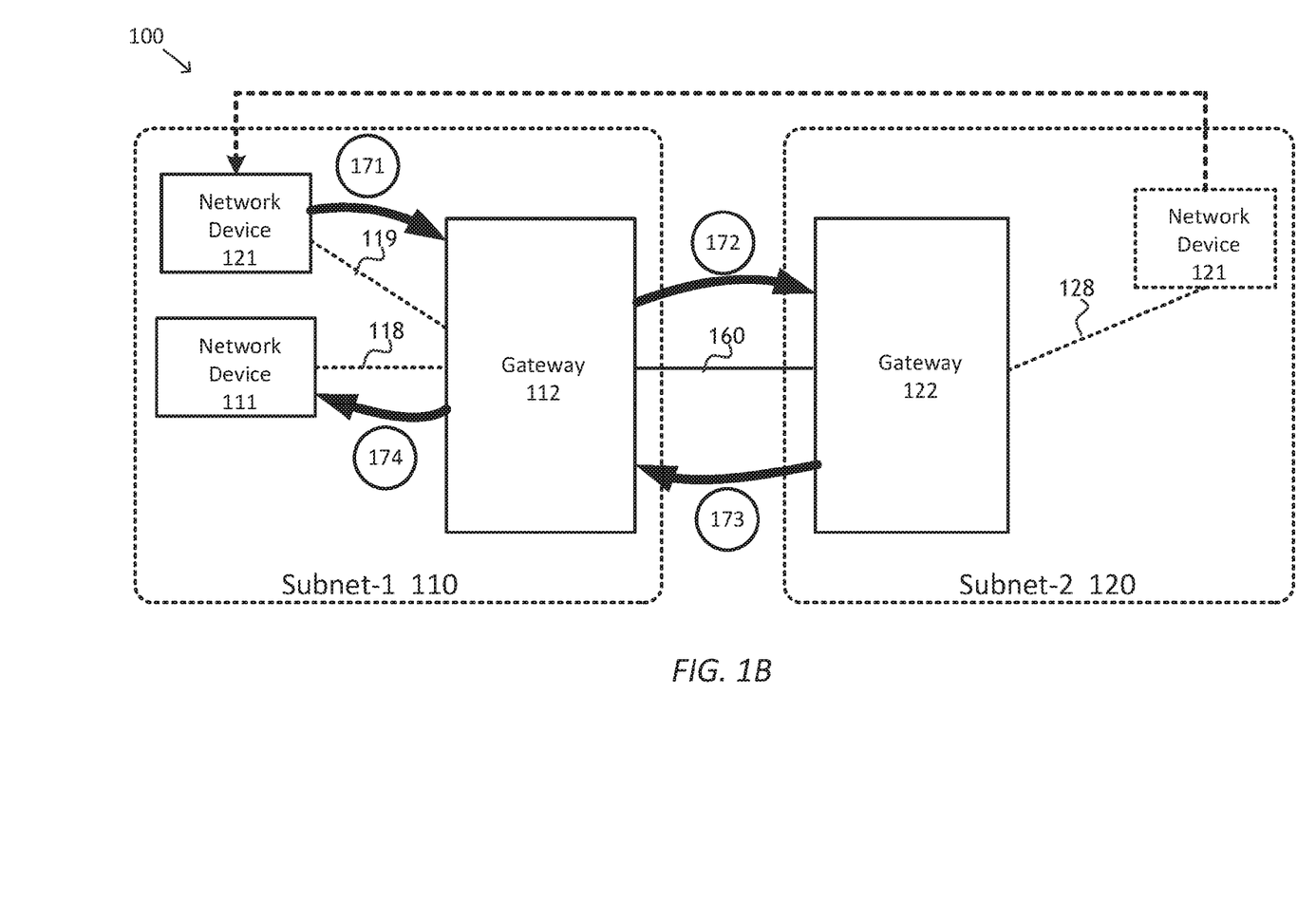
FIG. 1B is a simplified diagram showing the flow of the data packets in the network according to some embodiments.

FIG. 1B shows a flow of data packets in network 100 according to some embodiments. In some examples as shown in FIGS. 1A-1F, network device 121 is originally located in Subnet-2 120. When network device 121 moves to Subnet-1 110, network device 121 has been relocated from being coupled to gateway router 122, to being coupled to gateway router 112. In some embodiments, network device 121 may be directly coupled to gateway router 112 via link 119 in Subnet-1 110. In one example, network device 121 may be unplugged from gateway router 122, and then plugged in to gateway router 112. In some embodiments, network device 121 may not be directly coupled to gateway router 112, but may be coupled through one or more network switching devices (not shown). After network device 121 has moved to Subnet-1 110, network device 121 may retain its layer 3 address from Subnet-2 120. In some examples network device 121 may have received the layer 3 address during provisioning from a Dynamic Host Configuration Protocol (DHCP) server. In some examples, the layer 3 address may be an IP address.

Still referring to FIG. 1B, because the layer 3 address of network device 121 remains unchanged, the default gateway for network device 121 remains gateway router 122. Network device 121 may send a gateway address request asking for the layer 2 address of its default gateway, i.e. gateway 122. Sent by network device 121 to gateway router 112, the gateway address request is forwarded on one or more ports 113 of gateway router 112, then via link 160 to gateway router 122. When receiving the gateway address request, gateway router 122 may respond with the layer 2 address of gateway router 122, which is the default gateway of network device 121. In some examples, the gateway address request may be an address resolution protocol (ARP) request. In some examples, the layer 2 address may be a MAC address.

In some examples as illustrated in FIG. 1B, when network device 121 sends data packets destined to network device 111, data packets may be first received at gateway router 112 via path 171. Because the layer 3 address of network device 121 remains associated with Subnet-2 120, data packets are sent to the default gateway 122 of network device 121 via path 172. Based on the routing information stored in gateway router 122, gateway router 122 may recognize network device 111 is located in Subnet-1 110 and connected to gateway router 112. Gateway router 122 may then route the data packets back to gateway router 112 via path 173. Gateway router 112 may then forward the data packets to network device 111 via path 174.

This flow pattern, for example as indicated as paths 171-174 in FIG. 1B, may not be efficient. Hairpinning may occur in the flow of the data packets as long as the default gateway for network device 121 remains as gateway router 122. In general, hairpinning refers to the process of sending information back to the direction of its origination. The hairpinning flow pattern of the data packets may take up network bandwidth, and/or create more redundant routing paths. In some examples, a large number of network devices may be arranged in more complicated network layouts. The large number of network devices may also create multiple mobility events. The network bandwidth consumed by the hairpinning may slow down the wired/wireless enterprise networks.

Figure 1C:
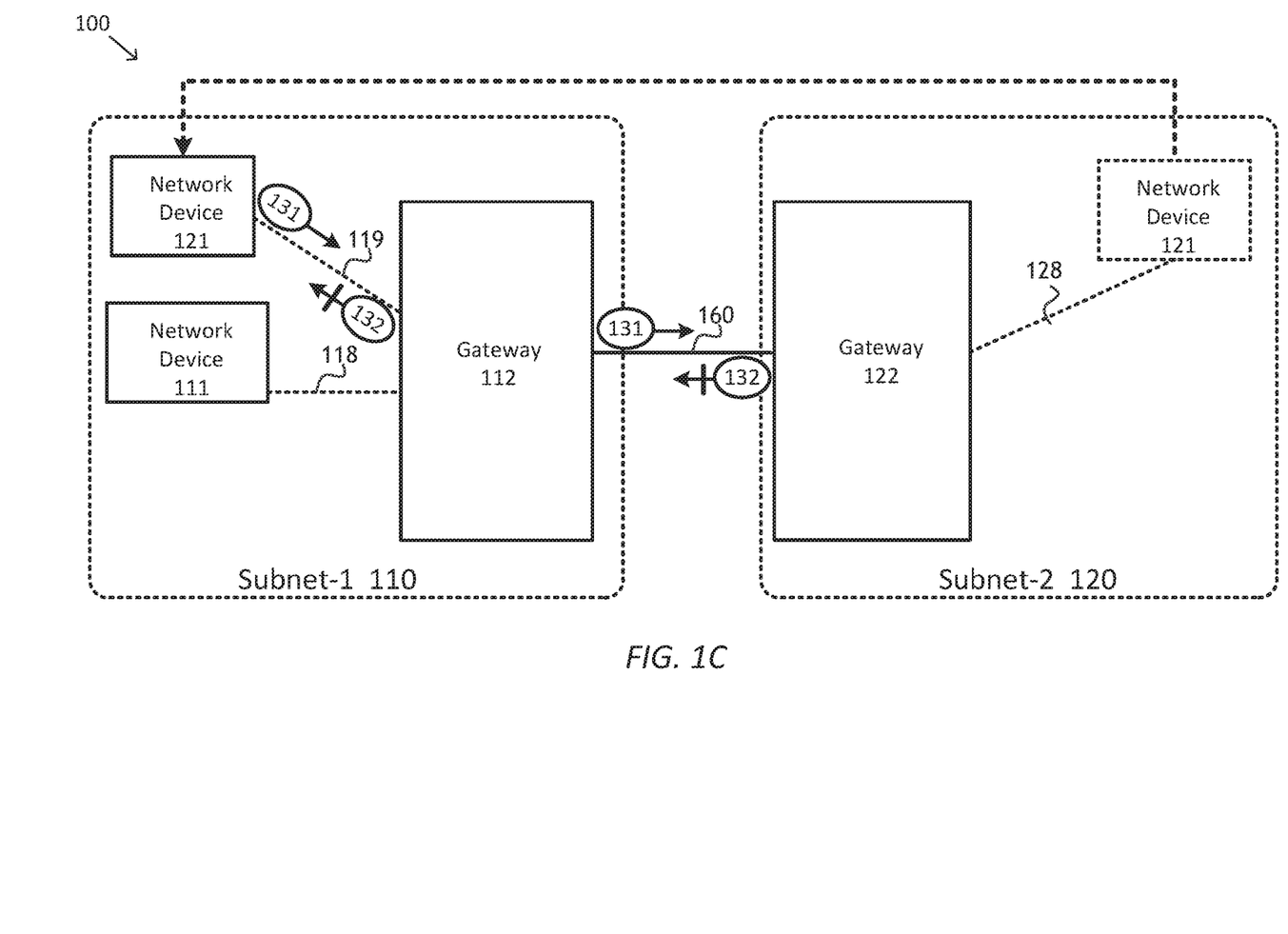
FIG. 1C is a simplified diagram showing a gateway address request routing example in the network according to some embodiments.

FIG. 1C is a simplified diagram showing a gateway address request routing example in network 100 according to some embodiments. After network device 121 moves to Subnet-1 110, network device 121 may be directly or indirectly coupled to gateway router 112. Because the default gateway router for network device 121 remains as gateway router 122, network device 121 may send a gateway address request 131 asking for the layer 2 address of the default gateway, i.e. gateway router 122. In some examples, the gateway address request 131 may include the layer 3 address of network device 121 as a sender protocol address. In some examples, the gateway address request 131 includes the layer 3 address of the default gateway, i.e. the layer 3 address of gateway router 122, as a target protocol address. In some embodiments, network device 121 may also periodically send additional gateway address requests to check if gateway router 122 is functioning properly. In some examples, the additional gateway address requests may be sent once every four hours. In some examples, the gateway address request may be an ARP request. In some examples, the layer 2 address may be a MAC address. In some examples, the layer 3 address may be an IP address.

Referring to FIG. 1C, after gateway 122 receives the gateway address request 131, controller 124 of gateway 122 determines whether the gateway address request 131 is received on an inter-domain link, i.e. link 160 between gateway 112 and gateway 122. In some embodiments, gateway 122 may exchange messages with gateway 112 to determine whether the gateway address request 131 is received on inter-domain link 160. In some embodiments, gateway 122 may determine whether the gateway address request 131 is received on inter-domain link 160 based on provisioning and/or configuration information received during provisioning of gateway 122.

In some embodiments, when controller 124 recognizes that gateway address request 131 is received on an inter-domain link 160, controller 124 of gateway 122 further determines whether the gateway address request 131 originated from gateway 112 associated with inter-domain link 160. In some embodiments, controller 124 of gateway 122 may exchange messages with gateway 112 to determine whether the gateway address request 131 originated from gateway 112. In some embodiments, controller 124 of gateway 122 may exchange messages with other network devices to determine where the gateway address request 131 originated from.

When it is determined that the gateway address request 131 is not originated from gateway 112, for example, the gateway address request 131 is originated from network device 121 coupled to gateway 112, gateway 122 may use gateway 112 as its proxy gateway for forwarding data packets sent from network device 121. In some examples, in order to designate gateway 112 as its proxy gateway, gateway 122 may associate its own layer 3 address with the layer 2 address of gateway 112 in the response to the gateway address request 131, so that data packets sent from network device 121 may be forwarded using gateway 112, instead of gateway 122 for routing and/or forwarding to a destination. In some examples, controller 124 of gateway 122 may determine the layer 2 address of gateway 112. For example, the layer 2 address of gateway 112 may be derived from the forwarding information tables in gateway 122. In some examples, when gateway 122 does not have the layer 2 address of gateway 112 stored in the forwarding information tables, gateway 122 may send a gateway address request to gateway 112 to obtain the layer 2 address of gateway 112.

Still referring to FIG. 1C, after the layer 2 address of gateway 112 is determined, controller 124 of gateway 122 may form a gateway address response 132 to the gateway address request 131. The gateway address response 132 may include data forwarding information associated with the default gateway for network device 121. In some embodiments, in order to designate gateway 112 as the proxy gateway of gateway 122, the data forwarding information includes the layer 2 address of gateway 112 as the default gateway instead of the layer 2 address of gateway 122. In some embodiments, the data forwarding information includes instructions for associating the layer 3 address of gateway 122 with the layer 2 address of gateway 112. In some embodiments, the data forwarding information includes instructions for routing layer 3 data packets from network device 121 to gateway 112 as the default gateway. Controller 124 of gateway 122 may transmit the gateway address response 132 on one or more ports 123 to gateway 112. Gateway 112 then forwards the gateway address response 132 to network device 121. In some examples, the gateway address response includes an ARP response. In some examples, the gateway address request includes an ARP request.

Figure 1D:
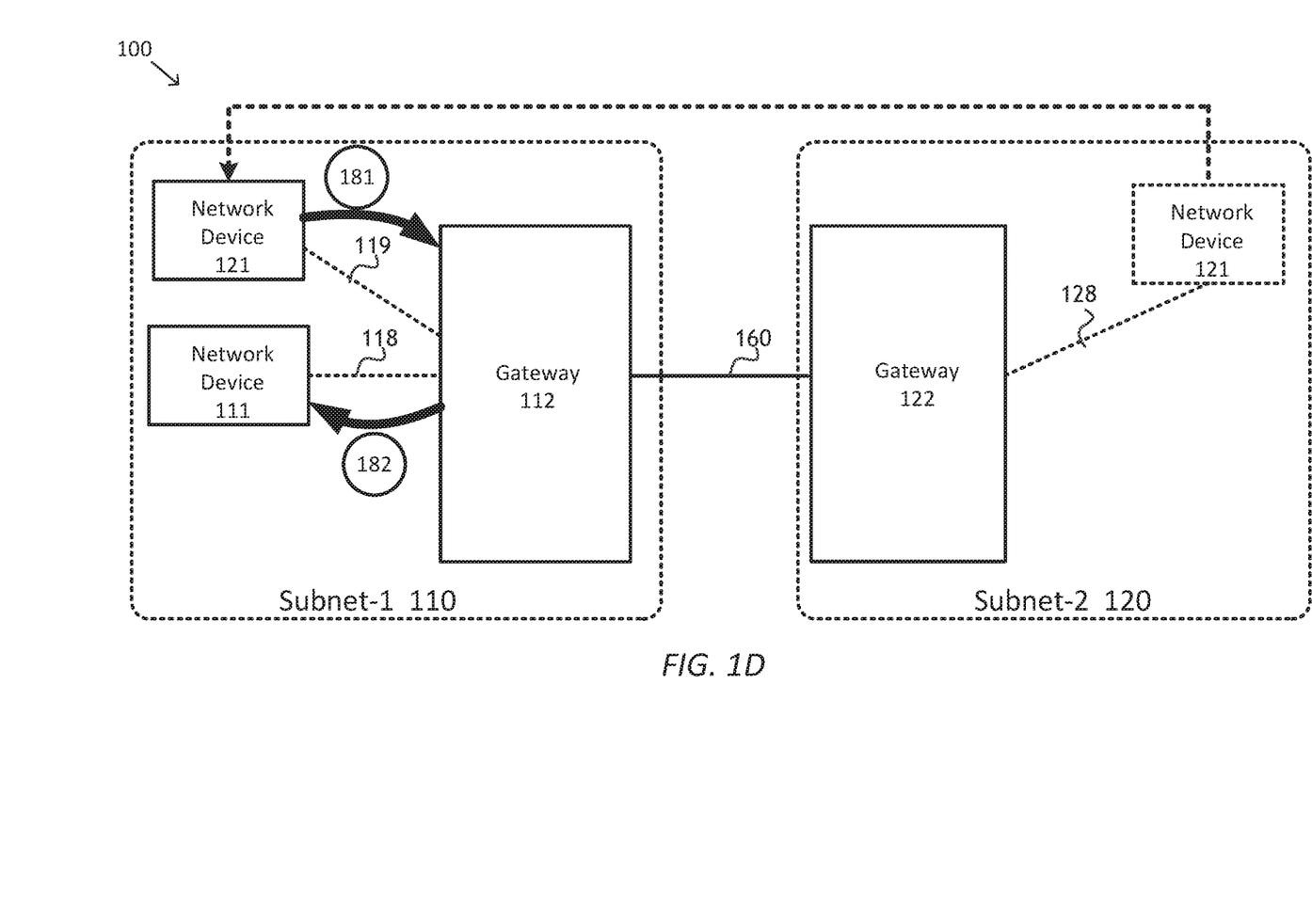
FIG. 1D is a simplified diagram showing a gateway address request routing example in the network according to some embodiments.

FIG. 1D is a simplified diagram showing a flow of data packets in network 100 after performing layer 3 proxy routing according to some embodiments. In some examples, by providing the layer 2 address of gateway 112, rather than its own layer 2 address, gateway 122 is using gateway 112 as its proxy gateway for network device 121. In some examples, network device 121 is originally coupled to gateway 122 in Subnet-2 120. Network device 121 may be then relocated from Subnet-2 120 to Subnet-1 110, and network device 121 may be coupled to gateway 112. As shown in FIG. 1C, network device 121 may send a gateway address request 131 asking for the layer 2 address of its default gateway. Network device 121 may further receive the gateway address response 132 from gateway 122 with the layer 2 address of gateway 112.

In some examples as illustrated in FIG. 1D, network device 121 may send data packets destined to network device 111. Network device 121 may first send the data packets to its default gateway, because the layer 3 address of network device 111 is in a different subnet (Subnet-1 110), than the layer 3 address of network device 121 (Subnet-2 120). However based on the updated gateway information in the gateway address response 132, the layer 3 address of gateway 122 is associated with the layer 2 address of gateway 112, thus the default gateway becomes gateway 112 as a proxy gateway for gateway 122. Therefore the data packets may be forwarded to gateway 112 via path 181, instead of all the way to gateway 122. Because network device 111 is in Subnet-1 110, gateway 112 may forward the data packets to network device 111 via path 182.

This flow pattern, for example as indicated as paths 181-182 in FIG. 1D, may be more efficient than paths 171-174 of FIG. 1B, because the hairpinning flow pattern of the data packets can be avoided. Data packets may be routed and forwarded without taking up extra bandwidth or creating redundant routing paths. The flow pattern disclosed herewith may be beneficial for a large number of network devices arranged in more complicated network layouts.

In some examples, when the gateway address request 131 is not received by gateway 122 on an inter-domain link, such as link 160, controller 124 of gateway 122 may form a gateway address response including the layer 2 address of gateway 122 to the gateway address request 131. This behavior preserves gateway 122 as the default gateway for network devices in Subnet-2 120.

Figure 1E:
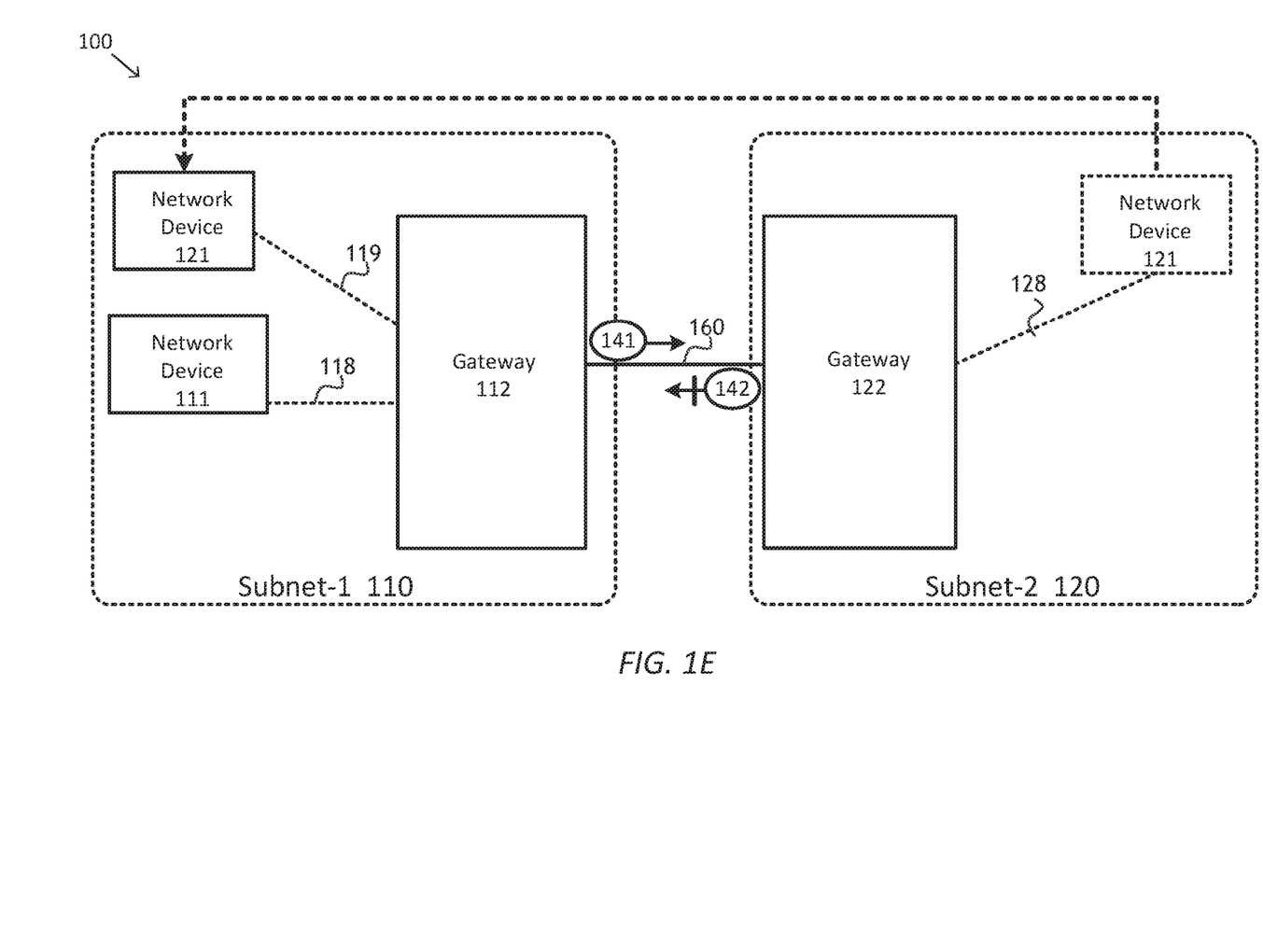
FIG. 1E is a simplified diagram showing a gateway address request routing example in the network according to some embodiments.

FIG. 1E is a simplified diagram showing a gateway address request routing example in the network 100 according to some embodiments. As discussed above, when controller 124 recognizes that the gateway address request 141 is received on an inter-domain link 160, controller 124 of gateway 122 further determines whether the gateway address request 141 originated from gateway 112. When gateway 122 recognizes that a gateway address request 141 originated from gateway 112, for example, gateway 122 may form and send a gateway address response 142. The gateway address response 142 may include its own layer 2 address, instead of substituting the layer 2 address of gateway 112.

Figure 1F:
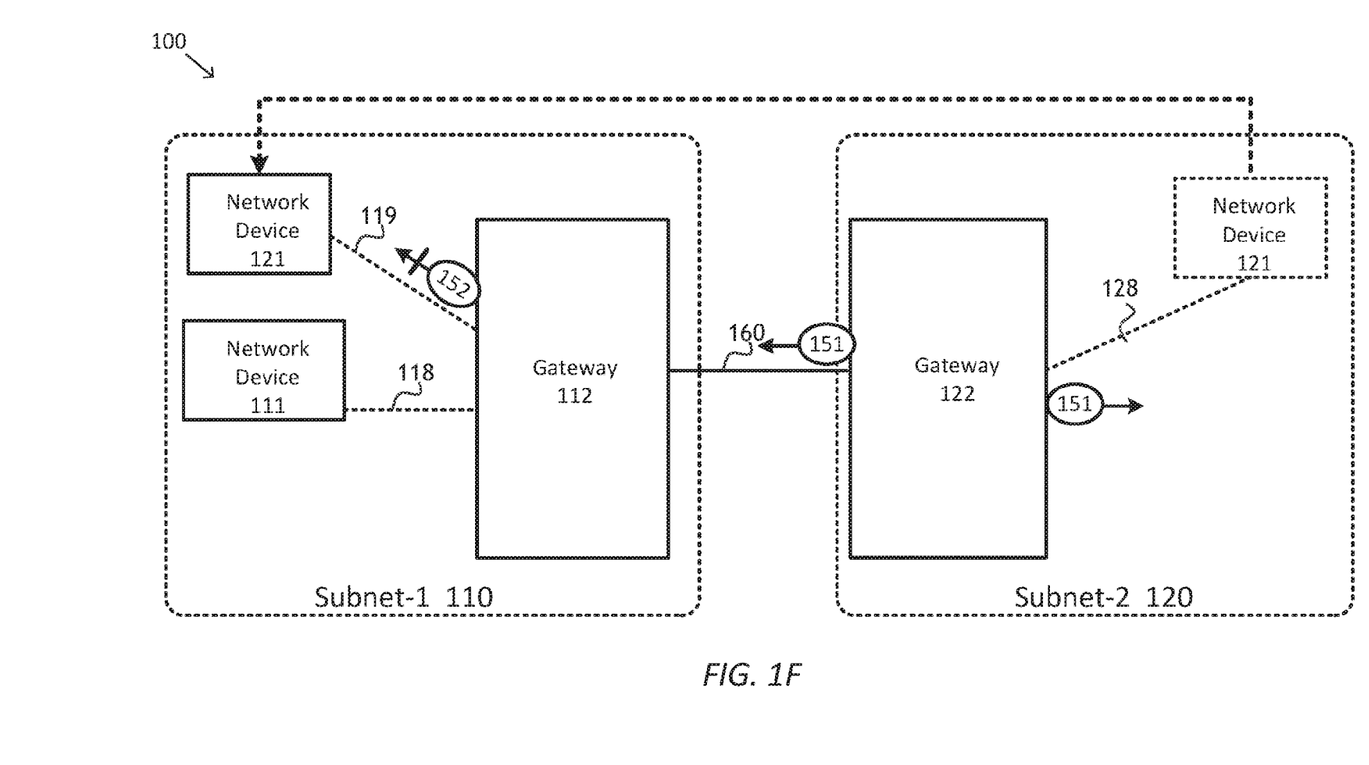
FIG. 1F is a simplified diagram showing a gratuitous gateway address request routing example in the network according to some embodiments.

FIG. 1F is a simplified diagram showing a gratuitous gateway address request routing example in the network 100 according to some embodiments. In some examples, when gateway router 122 reboots, gateway 122 may readvertise itself as a gateway. In order to readvertise itself as a gateway, gateway 122 may form one or more gratuitous gateway address requests 151. In some embodiments, the gratuitous gateway address requests 151 include information of associating gateway 122 with the layer 2 address of gateway 122. The gratuitous gateway address requests 151 may be targeted to a plurality of gateways in network 100, and/or multiple network devices in Subnet-2 120. In some examples, the gratuitous gateway address requests may include gratuitous ARP (GARP) requests.

Still referring to FIG. 1F, in some embodiments, gateway 122 may then transmit the gratuitous gateway address requests 151 to other gateways in network 100, so that the routing information stored in other gateways may be updated. For example, controller 124 may transmit the gratuitous gateway address requests 151 on one of the one or more ports 123 of gateway 122 to one or more ports 113 of gateway 112. In some examples, the gratuitous gateway address requests 151 may be also transmitted to network devices in Subnet-2 120, so that the gateway address mapping information stored in these network devices may be updated.

In order to preserve gateway 112 as the proxy gateway of gateway 122 for network device 121, after receiving the gratuitous gateway address requests 151 from gateway 122, gateway 112 may alter the gratuitous gateway address requests 151 to gratuitous gateway address requests 152 before forwarding the gratuitous gateway address requests to network device 121 in Subnet-1 110. In some embodiments, gratuitous gateway address requests 152 may include the layer 2 address of gateway 112. In some embodiments, the gratuitous gateway address requests 152 may include instructions for using the layer 2 address of gateway 112 as the gateway for network device 121. In this way, the default gateway of network device 121 in Subnet-1 110 becomes gateway 112, instead of gateway 122 during the readvertisement of gateway 122.

Figure 2A:
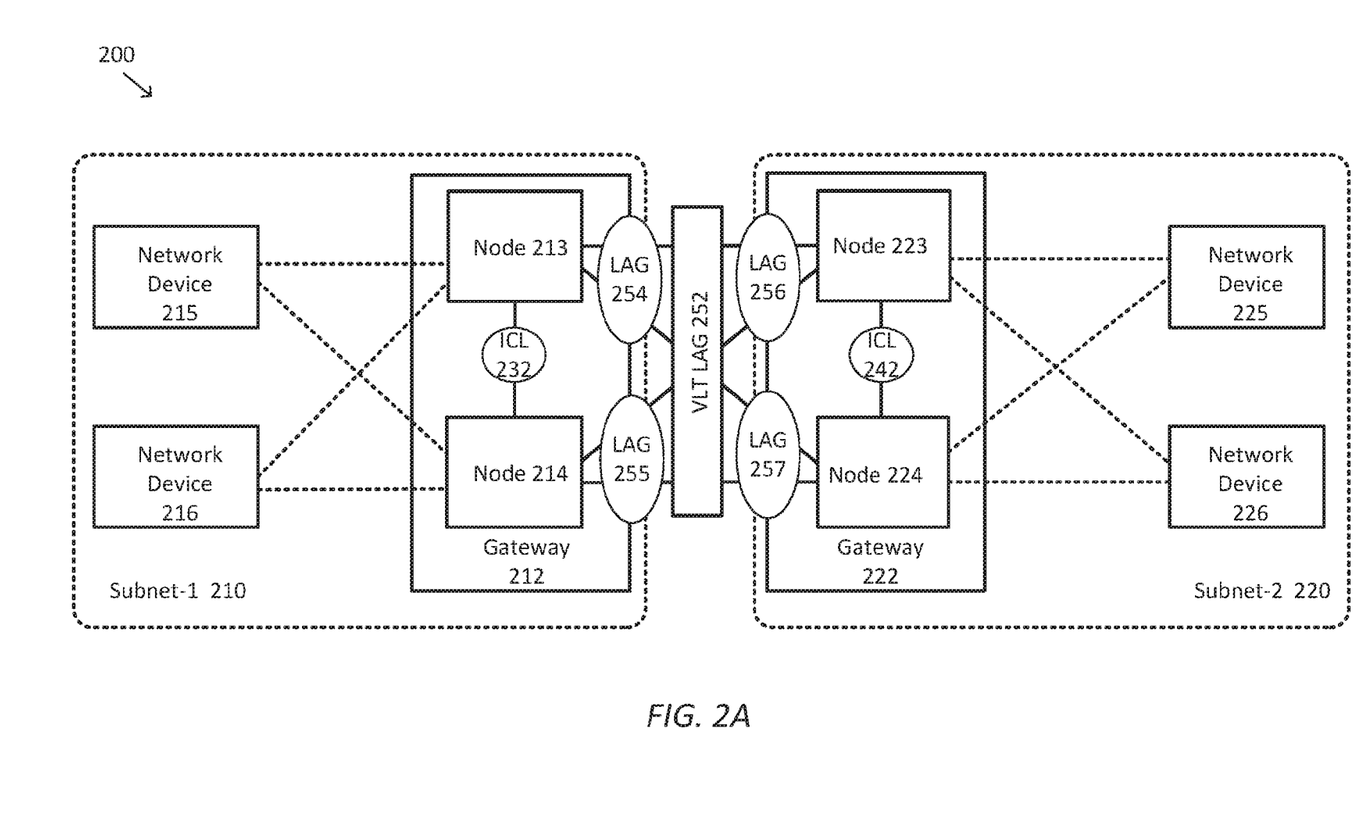
FIG. 2A is a simplified diagram showing the network according to some embodiments.

FIG. 2A shows a simplified diagram of network 200 according to some embodiments. As shown in FIG. 2A, network 200 may include two subnets Subnet-1 210 and Subnet-2 220. Network 200 may also include two gateways: a gateway 212 and a gateway 222. Each gateway may be a cluster of network nodes. In some examples, gateway 212 may provide substantially the same services as gateway 112. In some examples, gateway 222 may provide substantially the same services as gateway 122. In some examples, gateway 222 may perform substantially the same function as gateway 212. In some examples, Subnet-1 210 is Subnet-1 110, and Subnet-2 220 is Subnet-2 120. In some embodiments, gateway 212 may include two nodes: nodes 213 and 214. Node 213 may be a network switching device similar to gateway router 112 as illustrated in FIG. 1A. Node 213 may include one or more ports, a controller, and/or a memory. In some examples, the memory may include a L2 table, a L3 table, and/or other forwarding information tables and data structures. Node 214 may also be a network switching device similar to gateway router 112. Similarly gateway 222 may include two nodes: nodes 223 and 224. Node 223 may be a network switching device similar to gateway router 122 as illustrated in FIG. 1A. Node 224 may also be a network switching device similar to gateway router 122.

As illustrated in FIG. 2A, nodes 213 and 214 may be aggregated into an aggregate switch, such as gateway 212. In some examples, gateway 212 may include stacked switches. In some examples, gateway 212 may include a peer group. In some examples, nodes 213 and 214 may be referred to as peer nodes. Nodes 213 and 214 may be coupled together using one or more network links that form an inter-chassis link (ICL) 232. Although only one network link is shown in ICL 232, any number of network links may be used in ICL 232. The one or more network links in ICL 232 couple one or more ports of node 213 to one or more ports of node 214. In some examples, the network links in ICL 232 may be configured as a LAG. ICL LAG 232 allows both nodes 213 and 214 to refer collectively to any of the network links In some examples, nodes 213 and 214 may use ICL 232 to exchange management information. In some examples, the management information includes forwarding information. Although gateway 212 is shown with only two nodes 213 and 214, a person having ordinary skill in the art would be able to understand that gateway 212 may include any number of network nodes in any suitable topology.

Referring to FIG. 2A, nodes 223 and 224 may be aggregated into an aggregate switch, such as gateway 222. In some examples, gateway 222 may include stacked switches. In some examples, gateway 222 may include a peer group. In some examples, nodes 223 and 224 may be referred to as peer nodes. Nodes 223 and 224 may be coupled together using one or more network links that form an ICL 242. Although only one network link is shown in ICL 242, any number of network links may be used in ICL 242. The one or more network links in ICL 242 couple one or more ports of node 223 to one or more ports of node 224. In some examples, the network links in ICL 242 may be configured as a LAG. ICL LAG 242 allows both nodes 223 and 224 to refer collectively to any of the network links In some examples, nodes 223 and 224 may use ICL 242 to exchange management information. In some examples, the management information includes forwarding information. Although gateway 222 is shown with only two nodes 223 and 224, a person having ordinary skill in the art would be able to understand that gateway 222 may include any number of network nodes in any suitable topology.

Still referring to FIG. 2A, gateway 212 and gateway 222 may be coupled using a link 252. In some examples, link 252 may be a LAG 252. In some examples, link 252 may be a VLT LAG 252. While not shown in FIG. 2A, network 200 may include additional VLANs and VLTs coupling gateway 212 and/or gateway 222 to other network nodes and/or gateways in other parts of network 200. The configuration of network 200 may require the recognition of numerous interconnections (e.g., network links) among and between the network nodes and the gateways.

As shown in FIG. 2A, node 213 may be configured to group the network links between node 213 and gateway 222 (i.e. the network links between node 213 and nodes 223 and 224) as a LAG 254. Similarly, node 214 may be configured to group the network links between node 214 and gateway 222 as a LAG 255. Node 223 may be configured to group the network links between node 223 and gateway 212 as a LAG 256. Node 224 may be configured to group the network links between node 224 and gateway 212 as a LAG 257.

As discussed above and further emphasized here, FIG. 2A is merely an example, which should not unduly limit the scope of the application. One of ordinary skill in the art would recognize many variations, alternatives, and modifications. In some embodiments, network 200 may include fewer than two gateways or more than two gateways. In some embodiments, as more gateways are added to network 200, additional VLTs may be created. In some embodiments, each of gateways 212 and 222 may include more than two nodes. In some embodiments, as additional nodes are added to a gateway, additional ICLs are designated among the nodes. In some embodiments, fewer or more network links than what are shown in FIG. 2 may exist between any of the nodes 213, 214, 223, and/or 224.

Network 200 of FIG. 2A further includes a network device 215. In some examples, network device 215 may be an electronic device, a layer 2 network switching device, and/or a layer 3 network switching device. In some examples, network device 215 may be network device 111 as discussed in FIG. 1A. Network device 215 may be coupled to both nodes 213 and 214 of gateway 212. Any number of network links may be used to couple network device 215 to node 213 and/or node 214. In some examples, network device 215 may not be directly coupled to node 213 or 214, but through one or more network switching devices (not shown). Similarly network 200 may include a network device 216. Network device 216 may be coupled to both nodes 213 and 214 of gateway 212 using any number of network links In some examples, network device 216 may not be directly coupled to node 213 or 214, but through one or more network switching devices (not shown).

Network 200 of FIG. 2A further includes a network device 225. In some examples, network device 225 may be an electronic device, a layer 2 network switching device, and/or a layer 3 network switching device. In some examples, network device 225 may be network device 121 as discussed in FIG. 1A. Network device 225 may be coupled to both nodes 223 and 224 of gateway 222. Any number of network links may be used to couple network device 225 to node 223 and/or node 224. In some examples, network device 225 may not be directly coupled to node 223 or 224, but through one or more network switching devices (not shown). Similarly, network 200 may include a network device 226. Network device 226 may be coupled to both nodes 223 and 224 of gateway 222 using any number of network links In some examples, network device 226 may not be directly coupled to node 223 or 224, but through one or more network switching devices (not shown).

Figure 2B:
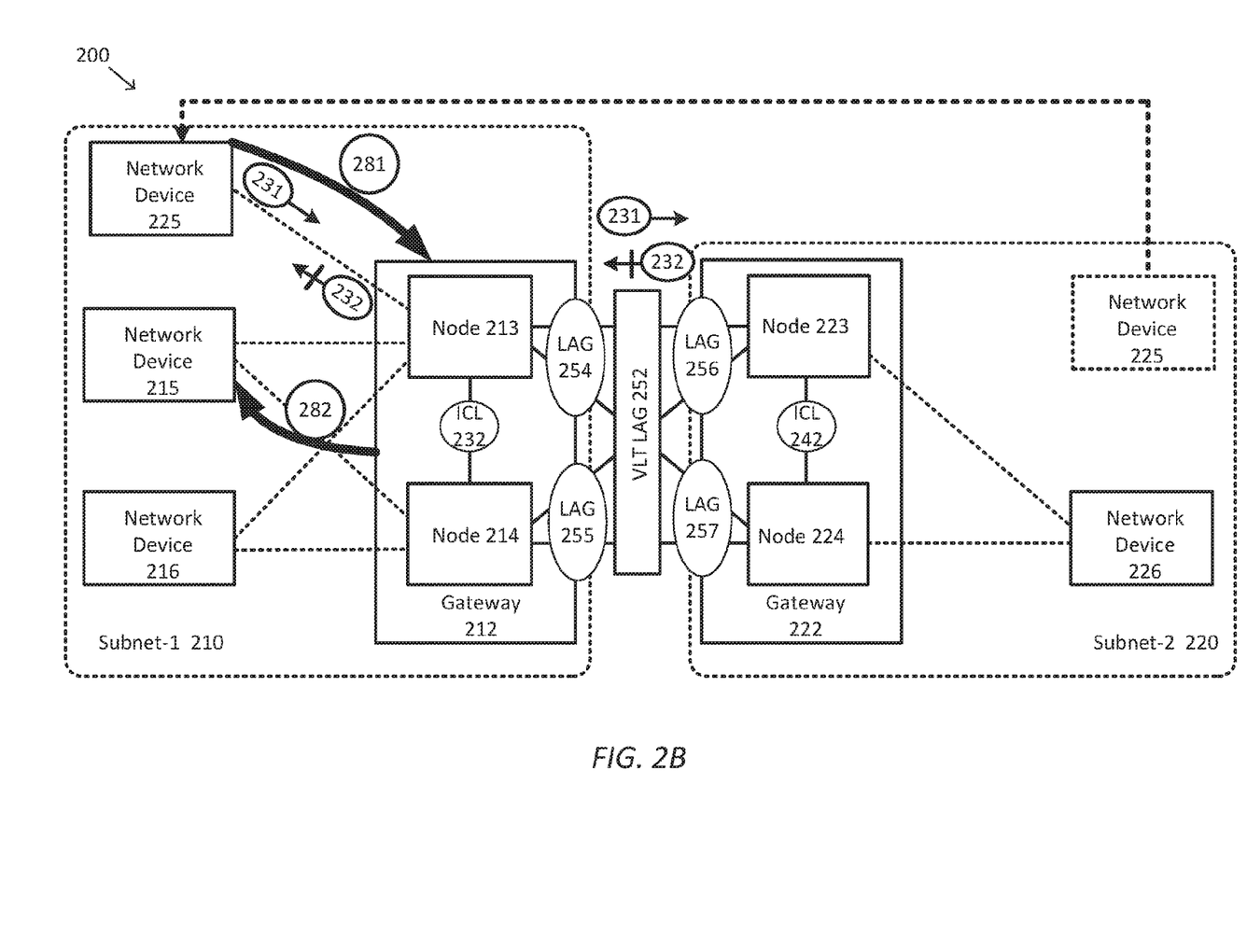
FIG. 2B is a simplified diagram showing an gateway address request routing example and the flow of the data packets in the network according to some embodiments.

Referring to FIG. 2B, in some examples, network device 225 may be moved from Subnet-2 220 to Subnet-1 210. After network device 225 moves to Subnet-1 210, network device 225 may be directly or indirectly coupled to gateway 212. Network device 225 may retain its layer 3 address from Subnet-2 220. Because the default gateway router for network device 225 remains as gateway 222, network device 225 may send a gateway address request 231 asking for the layer 2 address of the default gateway, i.e. gateway 222. In some embodiments, network device 225 may also periodically send additional gateway address requests to check if gateway 222 is functioning properly.

After gateway 222 receives the gateway address request 231, gateway 222 determines whether the gateway address request 231 is received on an inter-domain link, i e LAG 254, LAG 255, LAG 256, LAG 257, and/or VLT LAG 252. In some embodiments, when gateway 222 recognizes that the gateway address request 231 is received on an inter-domain link, and from network device 225 connected to gateway 212, gateway 222 may designate gateway 212 as its proxy gateway for network device 225. In some examples, gateway 222 may determine the layer 2 address of gateway 212. After the layer 2 address of gateway 212 is determined, gateway 222 may form a gateway address response 232 to the gateway address request 231. In some embodiments, the gateway address response 232 may include the layer 2 address of gateway 212 instead of the layer 2 address of gateway 222. In some embodiments, the gateway address response 232 may include instructions for associating the layer 3 address of gateway 222 with the layer 2 address of gateway 212, so that gateway 212 becomes the default gateway for network device 225 as a proxy gateway for gateway 222. In some embodiments, the gateway address response 232 may include instructions for forwarding layer 3 data packets from network device 225 to gateway 212 as the default gateway.

Still referring to FIG. 2B, in some examples, after being connected to gateway 212, network device 225 sends data packets destined to network device 215. Network device 225 may first send the data packets to the default gateway 212 via path 281. Because network device 215 is in Subnet-1 210, gateway 212 may route the data packets to network device 215 via path 282. Thus the hairpinning flow pattern of the data packets similar to paths 171-174 shown in FIG. 1B can be avoided.

When gateway 222 recognizes that the gateway address request is received on an inter-domain link, but originated from gateway 212, for example, gateway 212 may form and send a gateway address response. The gateway address response may include the layer 2 address of gateway 222, without substituting the layer 2 address of gateway 212. In some examples, this behavior may preserve gateway 222 as the default gateway for network devices in Subnet-2 220.

When gateway 222 recognizes that the gateway address request is not received by gateway 222 on an inter-domain link, gateway 222 may form a gateway address response including the layer 2 address of gateway 222 to the gateway address request. In some examples, this behavior may preserve gateway 222 as the default gateway for network devices in Subnet-2 220.

In some examples, when one or more nodes of gateway 222 reboot, gateway 222 may readvertise itself as a gateway by forming one or more gratuitous gateway address requests. In some embodiments, the gratuitous gateway address requests include information for broadcasting the layer 2 address of gateway 222. In some examples, the gratuitous gateway address requests may be targeted to a plurality of gateways in network 200, and/or multiple network devices in Subnet-2 220.

In order to preserve gateway 212 as the proxy gateway of gateway 222 for network device 225, after receiving the gratuitous gateway address requests from gateway 222, gateway 212 may alter the gratuitous gateway address requests to include the layer 2 address of gateway 212 before forwarding the gratuitous gateway address requests to network device 225 in Subnet-1 210. In some embodiments, the altered gratuitous gateway address requests may include instructions for using the layer 2 address of gateway 212 as the gateway for network device 225. In this way, the default gateway of network device 225 in Subnet-1 210 becomes gateway 212, instead of gateway 222 during the readvertisement of gateway 222.

Figure 3:
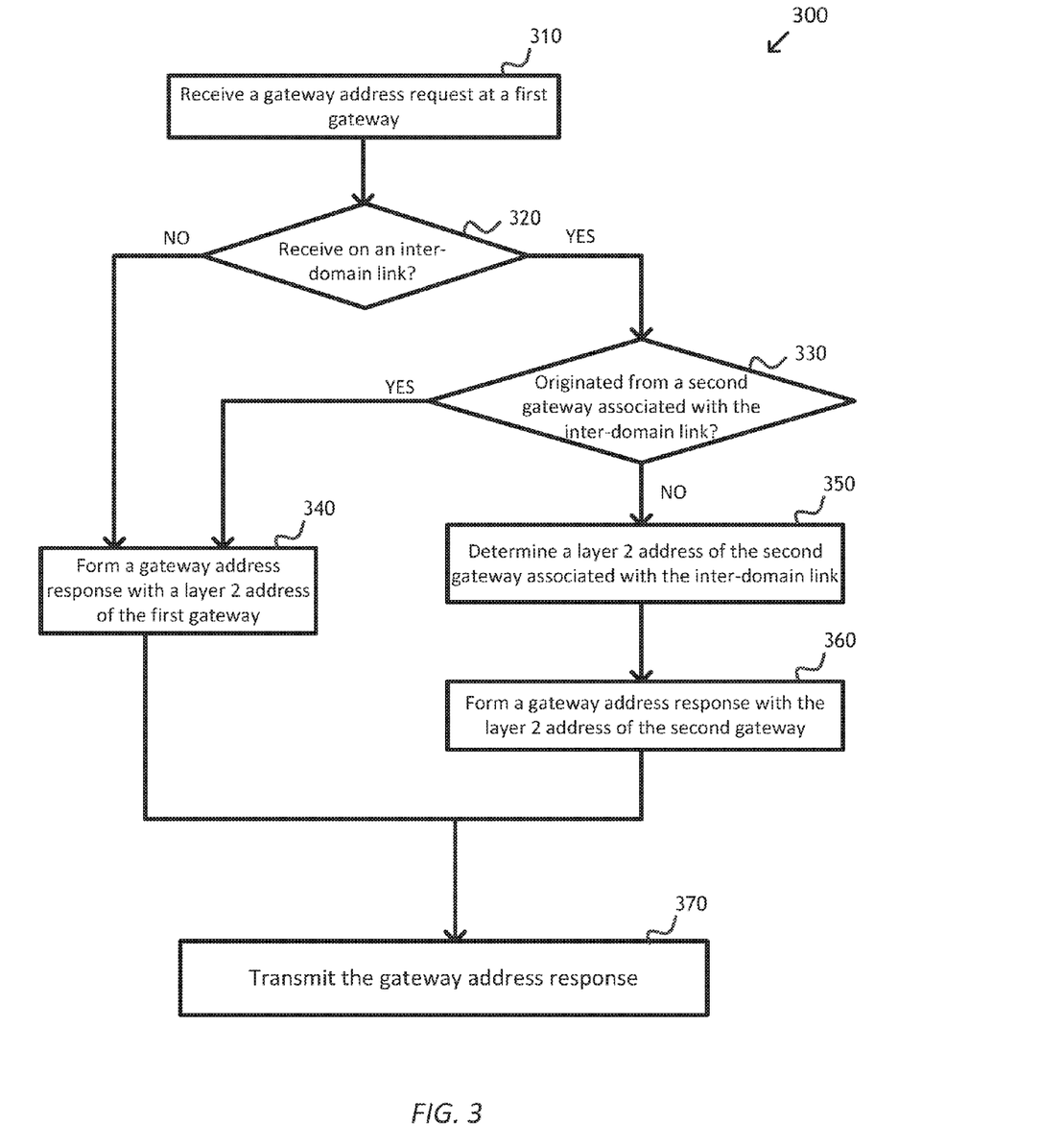
FIG. 3 is a simplified diagram showing a method of performing layer 3 proxy routing in a network according to some embodiments.

FIG. 3 is a simplified diagram showing a method 300 of managing a network according to some embodiments. As shown in FIG. 3A, method 300 includes a process 310 for receiving a gateway address request at a first gateway, a process 320 for determining whether the gateway address request is received on an inter-domain link When the gateway address request is received on an inter-domain link, method 300 proceeds to a process 330 for determining whether the gateway address request originated from a second gateway associated with the inter-domain link When the gateway address request is not originated from the second gateway associated with the inter-domain link, method 300 proceeds to a process 350 for determining a layer 2 address of the second gateway, a process 360 for forming a gateway address response including the layer 2 address of the second gateway, and a process 370 for transmitting the gateway address response. At process 320, when the ARP request is not received on an inter-domain link, method 300 proceeds to a process 340 for forming a gateway address response with the layer 2 address of the first gateway, and process 340 proceeds to process 370. At process 330, when the gateway address request is not originated from the second gateway associated with the inter-domain link, method 300 proceeds to process 340, and process 340 proceeds to process 370. In some embodiments, one or more of processes 310-370 of method 300 may be implemented, at least in part, in the form of executable code stored on non-transient, tangible, machine readable media that when run by one or more processors, may cause the one or more processors to perform one or more of processes 310-370. In some examples, the one or more processors may be included in a controller of a gateway (e.g., controller 114 of gateway 112, and/or controller 124 of gateway 122). The one or more processors may also be included in one or more nodes (e.g., nodes 213, 214, 223, and/or 224).

At process 310, a gateway address request is received at a first gateway. In some examples, the gateway address request may be gateway address request 131 and/or 231. In some examples, the first gateway may be gateway 122 and/or gateway 222. In some examples, the gateway address request is received at the first gateway to get the layer 2 address of the first gateway. In some examples, the gateway address request may be sent from a network device being moved from a first subnet to a second subnet. In some examples, the network device may be network device 121 and/or network device 225. In some examples, the first subnet may be Subnet-2 120 and/or Subnet-2 220. The second subnet may be Subnet-1 110 and/or Subnet-1 210.

At process 320, it is determined whether the gateway address request is received on an inter-domain link between the first gateway and a second gateway. In some examples, the inter-domain link may be link 160, 252, 254, 255, 256, and/or 257. In some examples, the second gateway may be gateway 112 and/or gateway 212. In some examples, the controller of the first gateway may determine whether the gateway address request is received on an inter-domain link by exchanging messages with the second gateway. In some embodiments, when the gateway address request is received on an inter-domain link, method 300 continues to process 330.

At process 330, it is determined whether the gateway address request originated from the second gateway associated with the inter-domain link In some examples, the first gateway may determine whether the gateway address request originated from the second gateway by exchanging messages with the second gateway. When the gateway address request is determined not to be originated from the second gateway, method 300 proceeds to process 350.

At process 350, the layer 2 address of the second gateway associated with the inter-domain link is determined In some examples, the layer 2 address of the second gateway may be derived from forwarding information tables in the first gateway. In some examples, when the first gateway does not have the layer 2 address of the second gateway stored in the forwarding information tables, the first gateway may send a gateway address request to the second gateway to obtain the layer 2 address of the second gateway.

At process 360, a gateway address response to the gateway address request is formed. In some examples, the gateway address response may be gateway address response 132 and/or 232. In some embodiments, the gateway address response is formed by the controller of the first gateway. The gateway address response may include data forwarding information associated with the network device. In some embodiments, the data forwarding information includes the layer 2 address of the second gateway as the default gateway instead of the layer 2 address of the first gateway. In some embodiments, the data forwarding information includes instructions for associating the layer 3 address of the first gateway 122 with the layer 2 address of the second gateway. In some embodiments, the data forwarding information includes instructions for routing layer 3 data packets from the network device to the second gateway as the default gateway.

At process 370, the gateway address response to the gateway address request is transmitted to the network device. In some embodiments, the controller of the first gateway may transmit the gateway address response on one or more ports to the second gateway. The second gateway then forwards the gateway address response to the network device.

At process 320, when the gateway address request is not received on the inter-domain link, method 300 continues to process 340. At process 340, a gateway address response to the gateway address request including data forwarding information is formed. The data forwarding information may include a layer 2 address of the first gateway. In some embodiments, the data forwarding information includes instructions for forwarding data packets from network devices in the first subnet to the first gateway as the default gateway. Process 340 then proceeds to process 370, where the gateway address response is transmitted to network devices in the first subnet.

At process 330, when a gateway address request is determined to be originated from the second gateway associated with the inter-domain link, method 300 proceeds to process 340. In some examples, the gateway address request may be gateway address request 141. At process 340, a gateway address response including data forwarding information is formed. In some examples, the gateway address response may be gateway address response 142. The data forwarding information may include its own layer 2 address without substituting the layer 2 address of the second gateway, as discussed in process 360. Process 340 then proceeds to process 370, where the gateway address response is transmitted to the second gateway.

Figure 4:
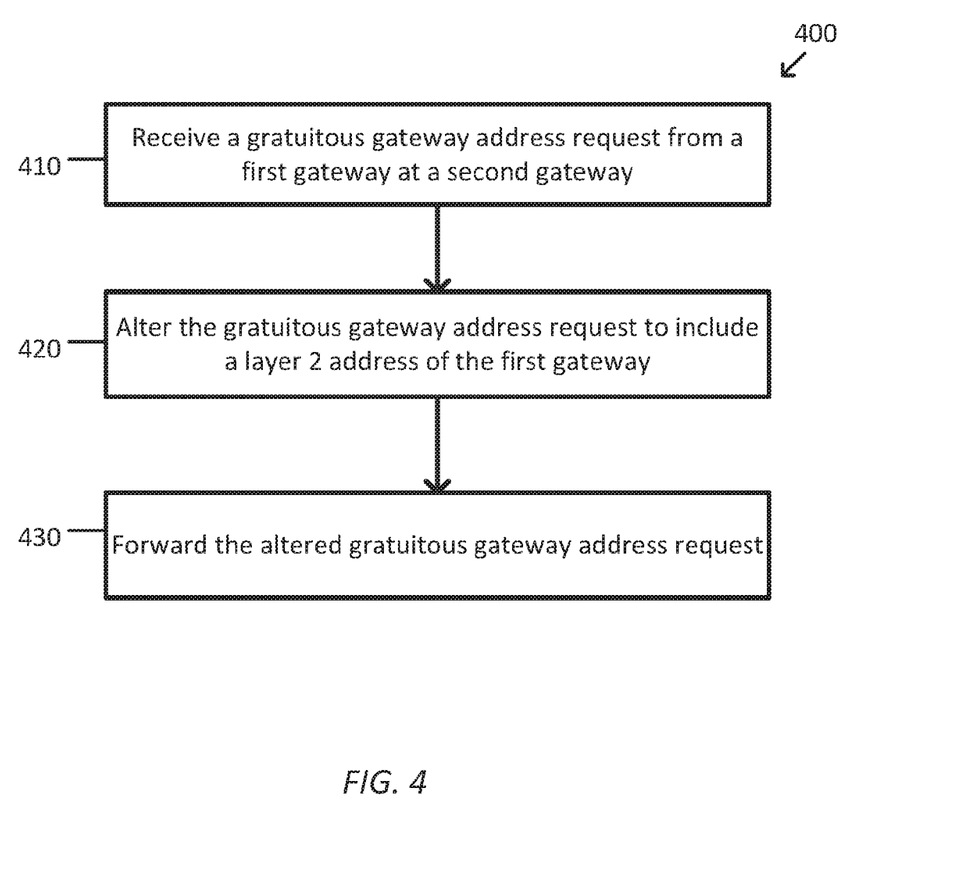
FIG. 4 is a simplified diagram showing a method of performing layer 3 proxy routing in a network according to some embodiments.

FIG. 4 is a simplified diagram showing a method 400 of managing a network according to some embodiments. As shown in FIG. 4, method 400 includes a process 410 for receiving a gratuitous gateway address request from a first gateway at a second gateway, a process 420 for altering the gratuitous gateway address request to include a layer 2 address of the first gateway, and a process 430 for forwarding the altered gratuitous gateway address request. In some embodiments, one or more of processes 410-430 of method 400 may be implemented, at least in part, in the form of executable code stored on non-transient, tangible, machine readable media that when run by one or more processors, may cause the one or more processors to perform one or more of processes 410-430. In some examples, the one or more processors may be included in a controller of a gateway (e.g., controller 114 of gateway 112, and/or controller 124 of gateway 122). The one or more processors may also be included in one or more nodes (e.g., nodes 213, 214, 215, and/or 216).

At process 410, a gratuitous gateway address request is sent from a first gateway and received at a second gateway. In some examples, the first gateway may be gateway 122 and/or gateway 222. The second gateway may be gateway 112 and/or gateway 212. In some examples, the first gateway may be gateway 112 and/or gateway 212. The second gateway may be gateway 122 and/or gateway 222. When the first gateway reboots, the first gateway may readvertise itself on the network (e.g., network 100 and/or network 200). The first gateway may form a gratuitous gateway address request to readvertise itself. In some examples, the gratuitous gateway address request may be gratuitous gateway address request 151. In some embodiments, the gratuitous gateway address request includes information for broadcasting the layer 2 address of the first gateway. The gratuitous gateway address request may be targeted to a plurality of gateways in network 100 and/or network 200, and/or multiple network devices in the first subnet.

At process 420, the second gateway may alter the gratuitous gateway address request to include a layer 2 address of the second gateway. In some examples, the altered gratuitous gateway address request may be altered gratuitous gateway address request 152. In some examples, in order to preserve the second gateway as the proxy gateway for the first gateway, the second gateway may alter the gratuitous gateway address request to associate the first gateway with the layer 2 address of the second gateway.

At process 430, the altered gratuitous gateway address request including the layer 2 address of the second gateway may be forwarded. In some examples, the altered gratuitous gateway address request may be forwarded to a moving network device (e.g., network device 121 and/or network device 225).

Some embodiments of network controller 114 and/or 124, and/or controller of network switching device 213, 214, 223 and/or 224, may include non-transient, tangible, machine readable media that include executable code that when run by one or more processors may cause the one or more processors to perform the processes of method 300 and/or method 400 as described above. Some common forms of machine readable media that may include the processes of method 300 and/or method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, the figure of the network controller is merely an example, which should not unduly limit the scope of the claims. One of ordinary skill in the art would recognize many variations, alternatives, and modifications. According to some embodiments, other architectures are possible for the network controller.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A first gateway associated with a first subnet, the first gateway comprising:
   a memory; and
   a controller coupled to the memory, the controller being configured to perform operations comprising:
   receiving, from a network device, a gateway address request having a source address associated with a second subnet;
   forwarding the gateway address request to a default gateway associated with the second subnet;
   receiving, from the default gateway, a gateway address response, wherein the gateway address response includes instructions to cause the network device to use the first gateway as a proxy gateway for the default gateway;
   forwarding the gateway address response to the network device;
   receiving, from the network device, data packets having the source address associated with the second subnet and a destination address associated with the first subnet; and
   forwarding the data packets to the destination address without forwarding the data packets to the default gateway.

2. The first gateway of claim 1, wherein the first gateway is configured to perform layer 3 routing within the first subnet, and the default gateway is configured to perform layer 3 routing within the second subnet.

3. The first gateway of claim 1, wherein the network device is moved from the second subnet to the first subnet.

4. The first gateway of claim 3, wherein the network device retains a layer 3 address associated with the second subnet when the network device is moved to the first subnet, the layer 3 address being the source address associated with the second subnet.

5. The first gateway of claim 1, wherein the gateway address request includes a request for a layer 2 address of the default gateway.

6. The first gateway of claim 1, wherein the first gateway is an aggregate switch comprising a cluster of nodes.

7. The first gateway of claim 6, wherein the first gateway is coupled to the default gateway by a link aggregation group (LAG).

8. The first gateway of claim 1, wherein the operations further comprise:
   transmitting a second gateway address request to the default gateway, the second gateway address request originating from the first gateway; and
   receiving, from the default gateway, a second gateway address response, wherein the second gateway address response includes instructions to cause the first gateway to forward data packets having a destination address associated with the second subnet to the default gateway.

9. The first gateway of claim 1, wherein the operations further comprise:
   receiving, from the default gateway, a gratuitous gateway address request;
   altering the gratuitous gateway address request to include instructions to cause the network device to use the first gateway as a proxy gateway for the default gateway; and
   forwarding the altered gratuitous gateway address request to the network device.

10. A method comprising:
    receiving, by a first gateway and from a network device located in a first subnet, a gateway address request having a source address associated with a second subnet, the first gateway having a processor and memory and being associated with the first subnet;
    forwarding the gateway address request to a default gateway associated with the second subnet;
    receiving, by the first gateway and from the default gateway, a gateway address response, wherein the gateway address response includes instructions to cause the network device to use the first gateway as a proxy gateway for the default gateway;
    forwarding, by the first gateway, the gateway address response to the network device;
    receiving, by the first gateway and from the network device, data packets having the source address associated with the second subnet and a destination address associated with the first subnet; and forwarding, by the first gateway, the data packets to the destination address without forwarding the data packets to the default gateway.

11. The method of claim 10, wherein the network device retains the source address associated with the second subnet when the network device is moved from the second subnet to the first subnet.

12. The method of claim 10, wherein the gateway address request includes a request for a layer 2 address of the default gateway.

13. The method of claim 10, wherein the first gateway is an aggregate switch comprising a cluster of nodes.

14. The method of claim 10, wherein the first gateway is coupled to the default gateway by a link aggregation group (LAG).

15. The method of claim 10, further comprising:
transmitting a second gateway address request to the default gateway, the second gateway address request originating from the first gateway; and
receiving, from the default gateway, a second gateway address response, wherein the second gateway address response includes instructions to cause the first gateway to forward data packets having a destination address associated with the second subnet to the default gateway.

16. The method of claim 10, further comprising:
receiving, by the first gateway and from the default gateway, a gratuitous gateway address request;
altering, by the first gateway, the gratuitous gateway address request to include instructions to cause the network device to use the first gateway as a proxy gateway for the default gateway; and
forwarding, by the first gateway, the altered gratuitous gateway address request to the network device.

17. An information handling system comprising
a first gateway, the first gateway comprising:
a memory; and
a controller coupled to the memory, the controller being configured to perform operations comprising:
receiving, from a network device associated with a first subnet, a gateway address request having a source address associated with a second subnet;
forwarding the gateway address request to a default gateway associated with the second subnet, the default gateway being coupled to the first gateway by an inter-domain link;
receiving, from the default gateway, a gateway address response, wherein the gateway address response includes instructions to cause the network device to use the first gateway as a proxy gateway for the default gateway;
forwarding the gateway address response to the network device;
receiving, from the network device, data packets having the source address associated with the second subnet and a destination address associated with the first subnet; and
forwarding the data packets to the destination address without sending the data packets over the inter-domain link.

18. The information handling system of claim 17, wherein the first gateway is an aggregate switch comprising a cluster of nodes.

19. The information handling system of claim 17, wherein the operations further comprise:
transmitting a second gateway address request to the default gateway, the second gateway address request originating from the first gateway; and
receiving, from the default gateway, a second gateway address response, wherein the second gateway address response includes instructions to cause the first gateway to forward data packets having a destination address associated with the second subnet to the default gateway.

20. The information handling system of claim 17, wherein the operations further comprise:
receiving, from the default gateway, a gratuitous gateway address request;
altering the gratuitous gateway address request to include instructions to cause the network device to use the first gateway as a proxy gateway for the default gateway; and
forwarding the altered gratuitous gateway address request to the network device.

* * * * *